(12) United States Patent
Lee

(10) Patent No.: US 11,507,988 B1
(45) Date of Patent: Nov. 22, 2022

(54) COMPUTERIZED SYSTEMS AND METHODS FOR PROVIDING A DYNAMIC PRICING SYSTEM

(71) Applicant: Coupang Corp., Seoul (KR)

(72) Inventor: Gil Ho Lee, Shanghai (CN)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/463,848

(22) Filed: Sep. 1, 2021

(51) Int. Cl.
G06Q 30/02 (2012.01)
G06Q 20/14 (2012.01)
G06Q 20/08 (2012.01)

(52) U.S. Cl.
CPC ..... *G06Q 30/0284* (2013.01); *G06Q 20/0855* (2013.01); *G06Q 20/145* (2013.01)

(58) Field of Classification Search
CPC ........... G06Q 30/0284; G06Q 20/0855; G06Q 20/145
See application file for complete search history.

(56) References Cited

U.S. PATENT DOCUMENTS

| | | | |
|---|---|---|---|
| 10,176,448 | B1 | 1/2019 | Rhodes et al. |
| 10,373,089 | B2* | 8/2019 | Zhang .............. G06Q 10/06311 |
| 10,402,841 | B2* | 9/2019 | Radhakrishnan .. G06Q 30/0206 |
| 10,467,561 | B2* | 11/2019 | Haparnas ......... G06Q 10/06311 |
| 10,896,433 | B2 | 1/2021 | Nayak et al. |
| 2009/0089147 | A1* | 4/2009 | Schoenberg ........... G06Q 10/06 705/2 |
| 2015/0142594 | A1* | 5/2015 | Lutnick .................. G06Q 30/04 705/26.81 |
| 2017/0372410 | A1* | 12/2017 | Fruhman ............ G06Q 30/0645 |
| 2018/0012166 | A1* | 1/2018 | Devadas .......... G06Q 10/06315 |

(Continued)

FOREIGN PATENT DOCUMENTS

| | | |
|---|---|---|
| KR | 10-2020-0055347 A | 5/2020 |
| KR | 10-2020-0098124 A | 8/2020 |
| WO | WO 2014/143652 A1 | 9/2014 |

OTHER PUBLICATIONS

Gupta, Vibhuti, and Hewett, Rattikorn, "Real-Time Tweet Analytics Using Hybrid Hashtags on Twitter Big Data Streams," Information, 11,341, Jun. 30, 2020.*

(Continued)

*Primary Examiner* — Nathan Erb
(74) *Attorney, Agent, or Firm* — Finnegan, Henderson, Farabow, Garrett & Dunner LLP

(57) ABSTRACT

Systems and methods are provided for dynamically adjusting payout to deliverers, comprising receiving a plurality of delivery orders, wherein each of the plurality of delivery orders is associated with a delivery address in a geographic region, and wherein the geographic region is associated with a plurality of configurations; determining a base fee for fulfilling the plurality of delivery orders in the geographic region based on the plurality of configurations associated with the geographic region; adjusting, using a pricing algorithm, the base fee for fulfilling the plurality of delivery orders based on the determined configurations; receiving one or more features associated with the plurality of delivery orders; and adjusting the adjusted base fee based on the received one or more features, wherein the pricing algorithm used to calculate the base fee is selected among a plurality of pricing algorithms based on the geographic region.

20 Claims, 10 Drawing Sheets

(56) References Cited

U.S. PATENT DOCUMENTS

2018/0314998 A1\* 11/2018 Liu ..................... G06Q 10/04
2018/0322420 A1\* 11/2018 Marco ................. G08G 1/202
2019/0285425 A1\* 9/2019 Ludwick ............. G05D 1/0291

OTHER PUBLICATIONS

Bedell, Eugene F., Transfer Pricing and the Optimal Allocation of Time-Sharing Resources, New York University, May 1972.\*
International Search Report and Written Opinion received in counterpart International Application No. PCT/IB2021/060411, dated May 31, 2022 (7 pages).

\* cited by examiner

COMPUTERIZED SYSTEMS AND METHODS FOR PROVIDING A DYNAMIC PRICING SYSTEM

TECHNICAL FIELD

The present disclosure generally relates to computerized systems and methods for dynamically adjusting payout to deliverers. In particular, embodiments of the present disclosure relate to inventive and unconventional systems relate to dynamically adjusting payout to deliverers in real-time by applying different pricing algorithms for different geographic regions.

BACKGROUND

Users (e.g., online customers, online merchants, delivery personnel) often use online website portals or mobile applications to order items (e.g., order food, grocery, etc.). By way of example, users maintain profiles that includes user information (e.g., location information, menu, name) at the online websites. An online ordering process requires multiple stages of online order processing, from when an order is placed to when the order is delivered. In a situation where a user places an online order requesting food to be delivered, a first stage may be for a merchant (e.g., a restaurant) to confirm the order or reject the order based on their availability to process the order. Upon receiving a confirmation of the order from the merchant, a request is sent to a delivery personnel to confirm or reject a pickup of order from the merchant based on their availability, as part of a second stage.

Conventional solutions for managing online delivery orders are generally ineffective in determining and adjusting a payout to deliverers (i.e., price paid to delivery personnel for fulfilling delivery orders). For example, some regions may require deliverers to travel farther to fulfill a single online order, while some regions may require deliverers to travel for a longer period of time to fulfill a single online order. Current solutions for managing online delivery orders, however, are generally ineffective in dynamically adjusting the payout to deliverers in real-time based on various factors that may affect delivery. Accordingly, a deliverer may often reject a pickup of order from a merchant because the payout is too low compared to, for example, the amount of time it would take to fulfill the order. As such, orders may be frequently delayed, resulting in poor customer experience and reduced efficiency in processing and managing delivery orders.

Moreover, conventional solutions for managing online delivery orders are mainly implemented using online services and, thus, may require Internet connection to efficiently manage online services. For example, systems for adjusting delivery costs and payout to deliverers for fulfilling delivery orders exist. However, these systems require constant polling of information via the Internet and continuous computation to adjust payout to deliverers based on market changes. Accordingly, when Internet connection is lost or a technical failure arises, conventional systems may be incapable of updating payout to deliverers in real-time to compensate for market changes.

Therefore, there is a need for computerized systems and methods for dynamically adjusting payout to deliverers based on various factors that may affect delivery so as to reduce time delays between processing of delivery orders across multiple geographic regions. In addition, there is a need for fail-safe computerized systems and methods for dynamically adjusting payout to deliverers to compensate for market changes even when technical failures arise.

SUMMARY

One aspect of the present disclosure is directed to a computer-implemented system for dynamically adjusting payout to deliverers. The system may comprise at least one processor; and at least one non-transitory storage medium comprising instructions that, when executed by the at least one processor, cause the at least one processor to perform steps. The steps may comprise receiving a plurality of delivery orders, wherein each of the plurality of delivery orders is associated with a delivery address in a geographic region, and wherein the geographic region is associated with a plurality of configurations; determining a base fee for fulfilling the plurality of delivery orders in the geographic region based on the plurality of configurations associated with the geographic region; adjusting, using a pricing algorithm, the base fee for fulfilling the plurality of delivery orders based on the determined configurations; receiving one or more features associated with the plurality of delivery orders; and adjusting the adjusted base fee based on the received one or more features, wherein the pricing algorithm used to calculate the base fee is selected among a plurality of pricing algorithms based on the geographic region.

In some embodiments, the plurality of configurations may comprise a threshold number of deliverers available to fulfill delivery orders and a threshold number of delivery orders that need to be fulfilled. In some embodiments, adjusting, using the pricing algorithm, the base fee for fulfilling the plurality of delivery orders may further comprise comparing a current number of deliverers available to fulfill delivery orders to the threshold number of deliverers available to fulfill delivery orders, comparing a current number of delivery orders that need to be fulfilled to the threshold number of delivery orders that need to be fulfilled, and adjusting the base fee based on the comparison of the number of delivers available and the comparison of the number of delivery orders that need to be fulfilled.

In other embodiment, the plurality of configurations may comprise a number of deliverers in a process of fulfilling delivery orders and a number of additional delivery orders placed. In some embodiments, adjusting, using the pricing algorithm, the base fee for fulfilling the plurality of delivery orders may further comprise determining a ratio of a current number of deliverers available to fulfill delivery orders and the number of deliverers in the process of fulfilling delivery orders to a current number of delivery orders that need to be fulfilled and the number of additional delivery orders placed, and adjusting the base fee based on the determined ratio. In some embodiments, the current number of deliverers available to fulfill delivery orders, the number of deliverers in the process of fulfilling delivery orders, the current number of delivery orders that need to be fulfilled, and the number of additional delivery orders placed are weighted.

In some embodiments, the plurality of configurations associated with the geographic region are continuously adjusted based on a number of delivery orders that need to be fulfilled and a number of deliverers available to fulfill delivery orders. In yet another embodiment, the processor may be further configured to execute the instructions to calculate a distance fee based on a total distance between a starting location and a delivery address associated with each of the plurality of delivery orders, and adjust the adjusted base fee based on the distance fee. In some embodiments, the one or more features may comprise at least one of a decline count associated with each of the plurality of delivery orders or one or more characteristics associated with a delivery route for each of the plurality of delivery orders. In other embodiments, the processor may be further configured to execute the instructions to predict, using a machine learning algorithm, at least one of a number of delivery orders that will need to be fulfilled or a future number of deliverers that will be available to fulfill delivery orders at a particular time.

Another aspect of the present disclosure is directed to a method for dynamically adjusting payout to deliverers. The method may comprise receiving a plurality of delivery orders, wherein each of the plurality of delivery orders is associated with a delivery address in a geographic region, and wherein the geographic region is associated with a plurality of configurations; determining a base fee for fulfilling the plurality of delivery orders in the geographic region based on the plurality of configurations associated with the geographic region; adjusting, using a pricing algorithm, the base fee for fulfilling the plurality of delivery orders based on the determined configurations; receiving one or more features associated with the plurality of delivery orders; and adjusting the adjusted base fee based on the received one or more features, wherein the pricing algorithm used to calculate the base fee is selected among a plurality of pricing algorithms based on the geographic region.

In some embodiments, the plurality of configurations may comprise a threshold number of deliverers available to fulfill delivery orders and a threshold number of delivery orders that need to be fulfilled. In some embodiments, adjusting, using the pricing algorithm, the base fee for fulfilling the plurality of delivery orders may further comprise comparing a current number of deliverers available to fulfill delivery orders to the threshold number of deliverers available to fulfill delivery orders, comparing a current number of delivery orders that need to be fulfilled to the threshold number of delivery orders that need to be fulfilled, and adjusting the base fee based on the comparison of the number of delivers available and the comparison of the number of delivery orders that need to be fulfilled.

In other embodiment, the plurality of configurations may comprise a number of deliverers in a process of fulfilling delivery orders and a number of additional delivery orders placed. In some embodiments, adjusting, using the pricing algorithm, the base fee for fulfilling the plurality of delivery orders may further comprise determining a ratio of a current number of deliverers available to fulfill delivery orders and the number of deliverers in the process of fulfilling delivery orders to a current number of delivery orders that need to be fulfilled and the number of additional delivery orders placed, and adjusting the base fee based on the determined ratio. In some embodiments, the current number of deliverers available to fulfill delivery orders, the number of deliverers in the process of fulfilling delivery orders, the current number of delivery orders that need to be fulfilled, and the number of additional delivery orders placed are weighted.

In some embodiments, the method may further comprise calculating a distance fee based on a total distance between a starting location and a delivery address associated with each of the plurality of delivery orders, and adjusting the adjusted base fee based on the distance fee. In some embodiments, the one or more features may comprise at least one of a decline count associated with each of the plurality of delivery orders or one or more characteristics associated with a delivery route for each of the plurality of delivery orders. In other embodiments, the method may further comprise predicting, using a machine learning algorithm, at least one of a number of delivery orders that will need to be fulfilled or a future number of deliverers that will be available to fulfill delivery orders at a particular time.

Yet another aspect of the present disclosure is directed to a computer-implemented system for dynamically adjusting payout to deliverers. The system may comprise at least one processor; and at least one non-transitory storage medium comprising instructions that, when executed by the at least one processor, cause the at least one processor to perform steps. The steps may comprise receiving a plurality of delivery orders, wherein each of the plurality of delivery orders is associated with a delivery address in a geographic region, wherein the geographic region is associated with a plurality of configurations, and wherein the plurality of configurations are continuously adjusted based on a number of delivery orders that need to be fulfilled and a number of deliverers available to fulfill delivery orders; determining a base fee for fulfilling the plurality of delivery orders in the geographic region based on the plurality of configurations associated with the geographic region; adjusting, using a pricing algorithm, the base fee for fulfilling the plurality of delivery orders based on the determined configurations; receiving one or more features associated with the plurality of delivery orders, wherein the one or more features comprise at least one of a decline count associated with each of the plurality of delivery orders or one or more characteristics associated with a delivery route for each of the plurality of delivery orders; and adjusting the adjusted base fee based on the received one or more features, wherein the pricing algorithm used to calculate the base fee is selected among a plurality of pricing algorithms based on the geographic region.

Other systems, methods, and computer-readable media are also discussed herein.

DETAILED DESCRIPTION

Figure 1A:
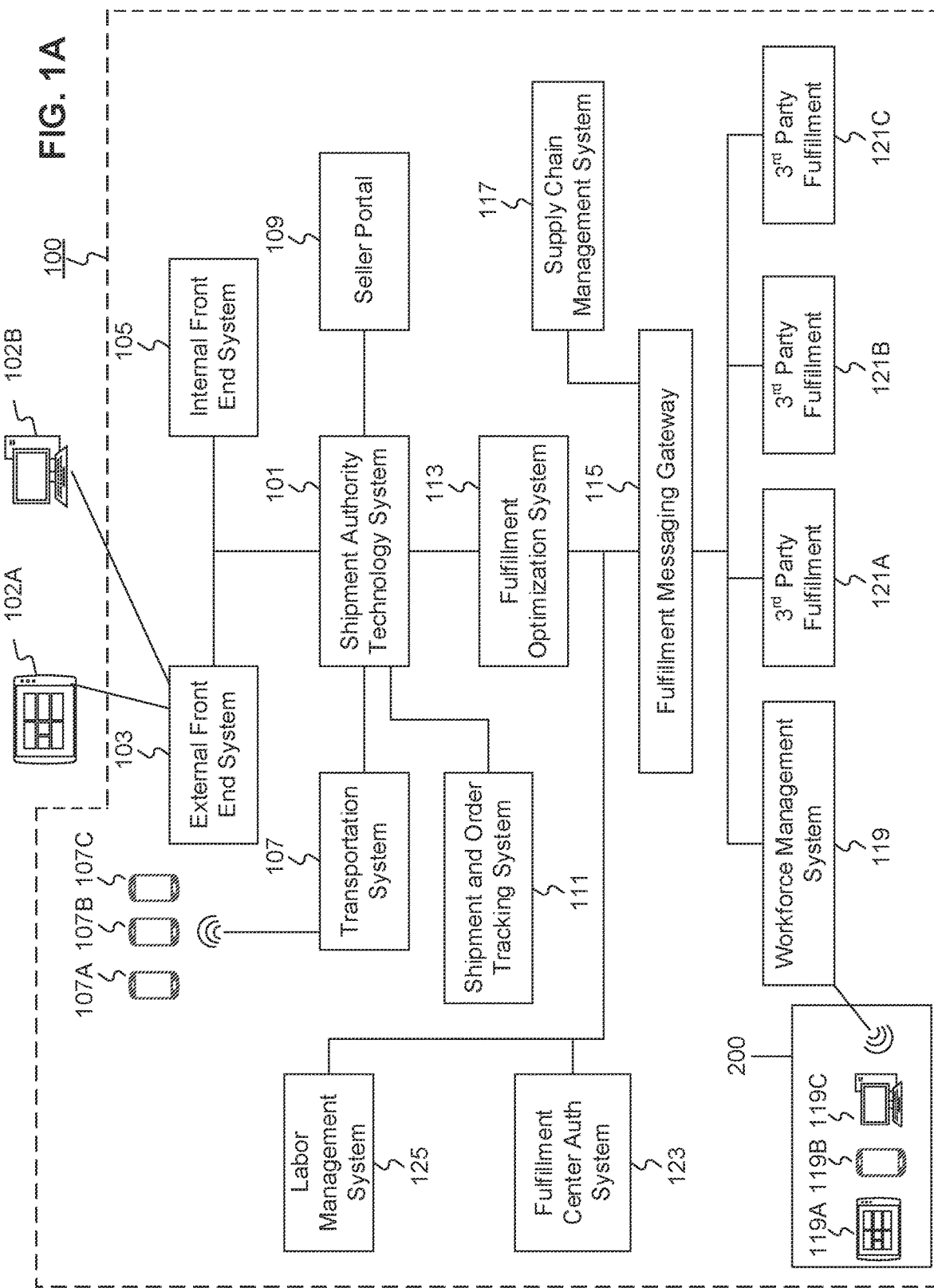
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for dynamically adjusting payout to deliverers. The disclosed embodiments are advantageously capable of dynamically adjusting payout to deliverers in real-time based on various factors that may affect delivery in each region by applying different pricing algorithms for different geographic regions. In some embodiments, the disclosed embodiments are advantageously capable of dynamically adjusting payout to deliverers in real-time by using a machine learning algorithm to predict, for example, at least one of a number of delivery orders that will need to be fulfilled or a future number of deliverers that will be available to fulfill delivery orders at a particular time.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
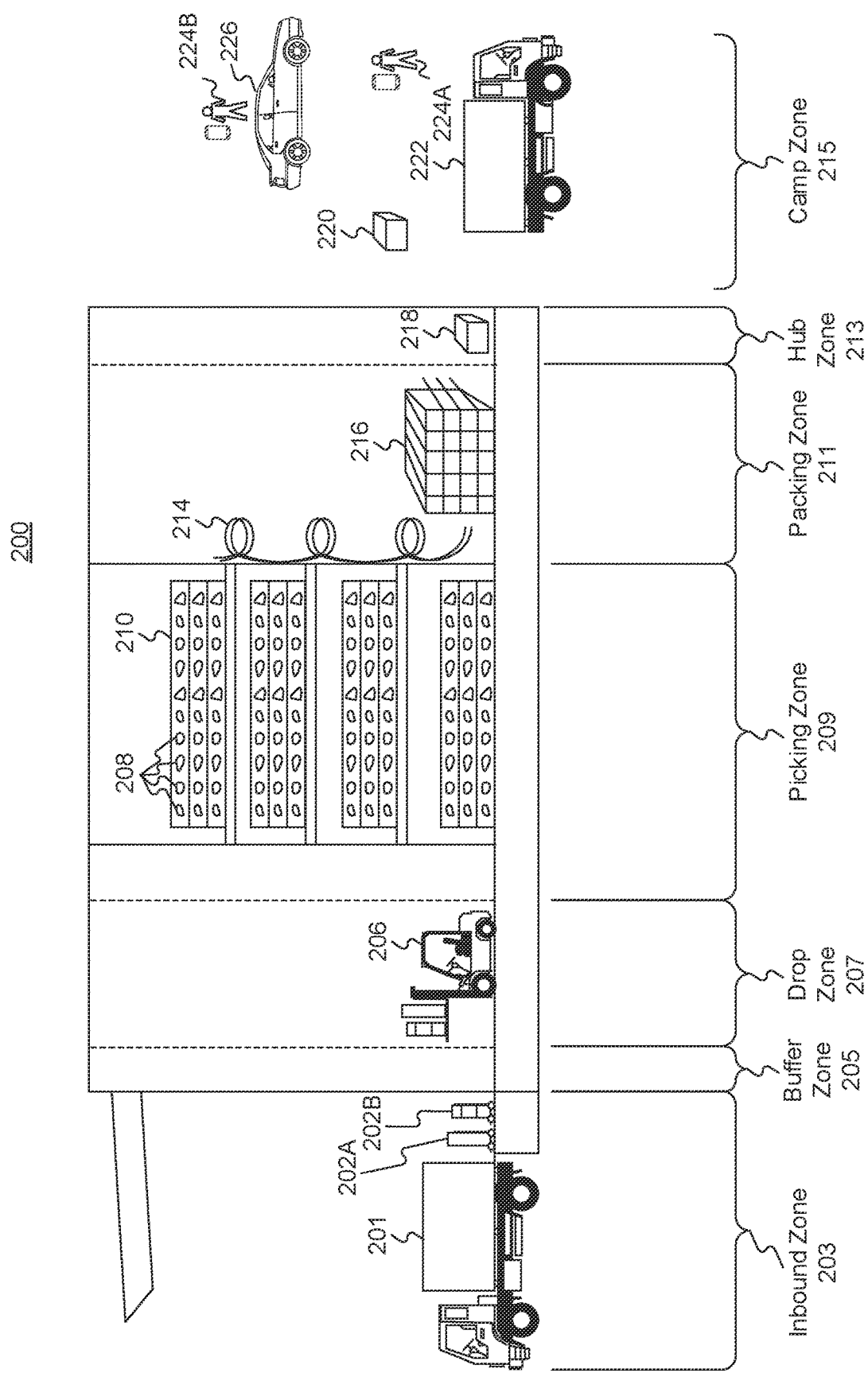
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207.

If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119б to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
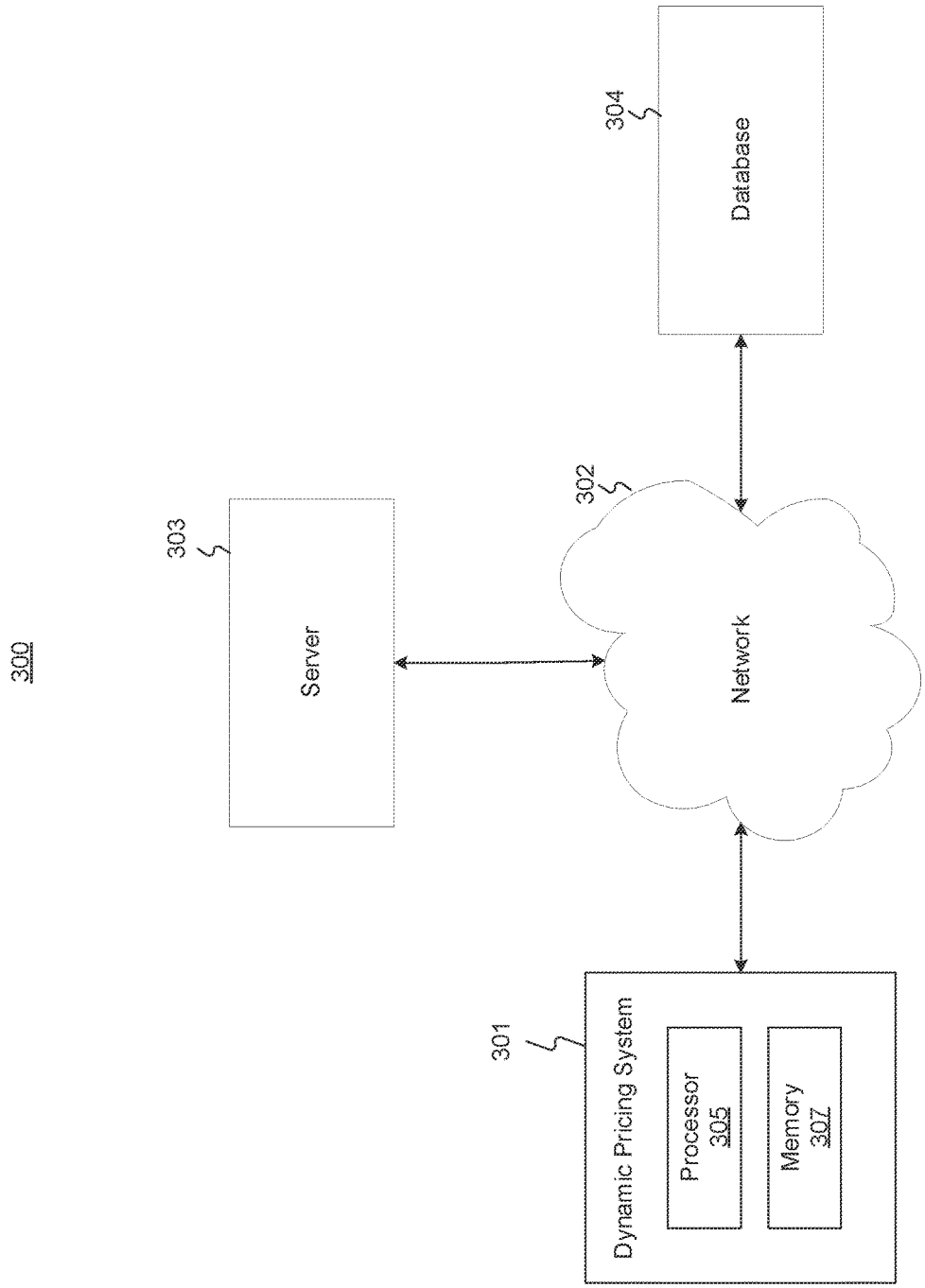
FIG. 3 is a schematic block diagram illustrating an exemplary embodiment of a system comprising computerized systems for dynamically adjusting payout to deliverers, consistent with the disclosed embodiments.

Referring to FIG. 3, a schematic block diagram illustrating an exemplary embodiment of a system for dynamically adjusting payout to deliverers is shown. As illustrated in FIG. 3, system 300 may comprise a dynamic pricing system 301, server 303, and database 304, each of which may communicate with each other via a network 302. In some embodiments, dynamic pricing system 301 and/or server 303 may communicate with each other and with the other components of system 300 via a direct connection, for example, using a cable. In some other embodiments, system 300 may be a part of system 100 of FIG. 1A and may communicate with the other components of system 100 (e.g., external front end system 103 or internal front end system 105) via network 302 or via a direct connection, for example, using a cable. Dynamic pricing system 301 and/or server 303 may each comprise a single computer or may each be configured as a distributed computer system including multiple computers that interoperate to perform one or more of the processes and functionalities associated with the disclosed examples.

As shown in FIG. 3, dynamic pricing system 301 may comprise a processor 305 and memory 307. Processor 305 may be one or more known processing devices, such as a microprocessor from the Pentium™ family manufactured by Intel™ or the Turion™ family manufactured by AMD™. Processor 305 may constitute a single core or multiple core processor that executes parallel processes simultaneously.

For example, processor 305 may use logical processors to simultaneously execute and control multiple processes. Processor 305 may implement virtual machine technologies or other known technologies to provide the ability to execute, control, run, manipulate, store, etc. multiple software processes, applications, programs, etc. In another example, processor 305 may include a multiple-core processor arrangement configured to provide parallel processing functionalities to allow dynamic pricing system 301 and/or server 303 to execute multiple processes simultaneously. One of ordinary skill in the art would understand that other types of processor arrangements could be implemented that provide for the capabilities disclosed herein.

Memory 307 may store one or more operating systems that perform known operating system functions when executed by processor 305. By way of example, the operating system may include Microsoft Windows, Unix, Linux, Android, Mac OS, iOS, or other types of operating systems. Accordingly, examples of the disclosed invention may operate and function with computer systems running any type of operating system. Memory 307 may be a volatile or non-volatile, magnetic, semiconductor, tape, optical, removable, non-removable, or other type of storage device or tangible computer readable medium.

Database 304 may include, for example, Oracle™ databases, Sybase™ databases, or other relational databases or non-relational databases, such as Hadoop™ sequence files, HBase™, or Cassandra™. Database 304 may include computing components (e.g., database management system, database server, etc.) configured to receive and process requests for data stored in memory devices of the database(s) and to provide data from the database(s). Database 304 may include NoSQL databases such as H Base, MongoDB™ or Cassandra™. Alternatively, database 304 may include relational databases such as Oracle, MySQL and Microsoft SQL Server. In some embodiments, database 304 may take the form of servers, general purpose computers, mainframe computers, or any combination of these components.

Database 304 may store data that may be used by processor 305 for performing methods and processes associated with disclosed examples. While FIG. 3 illustrates database 304 external to dynamic pricing system 301, database 304 may be located in dynamic pricing system 301. In some embodiments, system 300 may include more than one database 304. Data stored in database 304 may include any suitable data associated with delivery orders and/or deliverers that can be used to select a pricing algorithm and to determine and/or adjust payout to deliverers. For example, data stored in database 304 may include features associated with delivery orders, such as delivery addresses associated with the delivery orders, delivery route associated with each delivery order, timestamp of each delivery order, or the like. In addition, data stored in database 304 may include deliverer features or features associated with the deliverers, such as user name of each deliverer, customer rating of each deliverer, deliverer's past delivery history, etc. In other embodiments, data stored in database 304 may include historical data associated with payout to deliverers, pricing algorithms, and historical data associated with pricing model-to-geographic region mapping (e.g., which pricing algorithm was previously mapped to each geographic region in the past). In some embodiments, data stored in database 304 may be used as training data to train, for example, a machine learning algorithm to dynamically adjust payout to deliverers. Accordingly, dynamic pricing system 301 may communicate with database 304 via network 302 to train one or more machine learning models and/or algorithms using training data stored in database 304. Additionally or alternatively, such training data may be stored directly in dynamic pricing system 301, rather than in an external database, such as database 304.

System 300 may also comprise a server 303. Server 303 may be a web server. Server 303, for example, may include hardware (e.g., one or more computers) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an application programming interface (API) defined by the platform itself.

In some embodiments, one or more processors 305 of dynamic pricing system 305 may use data stored in database 304 to train one or more machine learning algorithms to dynamically adjust payout to deliverers in real-time. For example, one or more processors 305 may retrieve historical data associated with past delivery orders or past activities of deliverers, or the like, via server 303 and stored in database 304 to predict demand in a geographic region, such as the number of delivery orders that need to be fulfilled in a geographic region, and/or supply in a geographic region, such as the number of deliverers that may be available to fulfill delivery orders in a geographic region. Based on the prediction, one or more processors 305 may preemptively adjust payout to deliverers to increase the likelihood of deliverers accepting pending delivery orders, thereby reducing any delays in delivery order fulfillment. In some embodiments, one or more processors 305 may predict demand in a geographic region, such as the number of delivery orders that may need to be fulfilled in a geographic region in the future, and preemptively adjust the payout to deliverers (e.g., increase the price paid to deliverers) to ensure that a sufficient number of deliverers will be available to fulfill the delivery orders in the geographic region. In some embodiment, one or more processors 305 may also preemptively adjust the payout to deliverers (e.g., decrease the price paid to deliverers) to reduce the number of deliverers that will be available to fulfill delivery orders in the future, particularly when one or more processors 305 predicts that the number of delivery orders will decrease in the future.

In some embodiments, one or more processors 305 may select a pricing algorithm among a plurality of algorithms to determine payout to deliverers in a particular geographic region. For example, in order to determine payout to deliverers in a particular geographic region, one or more processors 305 may select a pricing algorithm that best manages cost of fulfilling delivery orders and improves customer experience by, for instance, minimizing backlogs. Using the selected pricing algorithm, one or more processors 305 may determine the base fee that should be paid to deliverers for fulfilling delivery orders. In other embodiments, one or more processors 305 may retrieve features associated with delivery orders, configurations associated with geographic regions, or the like to adjust the base fee that should be paid to deliverers. For example, one or more processors 305 may be configured to adjust (e.g., increase or decrease) the base fee based on a delivery address associated with a delivery order, number of deliverers available to fulfill delivery orders in each geographic region, number of delivery orders that need to be fulfilled in a geographic region, number of deliverers currently in the process of fulfilling orders, number of additional delivery orders that have been placed, decline count associated with each delivery order, characteristics associated with a delivery route for each delivery order, or the like.

In other embodiments, one or more processors 305 may use the machine learning model to predict a number of delivery orders that will need to be fulfilled or a future number of deliverers that will be available to fulfill delivery orders at a particular time. In some embodiments, one or more processors 305 may use the machine learning model and/or algorithm to shape demand in the future. For example, one or more processors 305 may use a machine learning algorithm to predict that, within a particular time period in the future, the number of deliverers available to fulfill delivery orders will significantly decrease in a particular geographic region. Accordingly, one or more processors 305 may use a ranking algorithm to arrange and/or rearrange the list of merchants that are displayed on a user interface of a user device. By way of example, one or more processors 305 may use the ranking algorithm to rearrange the list of merchants such that merchants within the particular geographic region and/or in close proximity to the particular geographic region is displayed at the top of the user interface to drive demand to those nearby merchants. Merchants that are farther away from the particular geographic region may be ranked lower and displayed at the bottom of the user interface (or not displayed at all) to reduce the likelihood of customers placing delivery orders at the merchants that are farther away from the particular geographic region.

System 300 may also comprise a network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Figure 4:
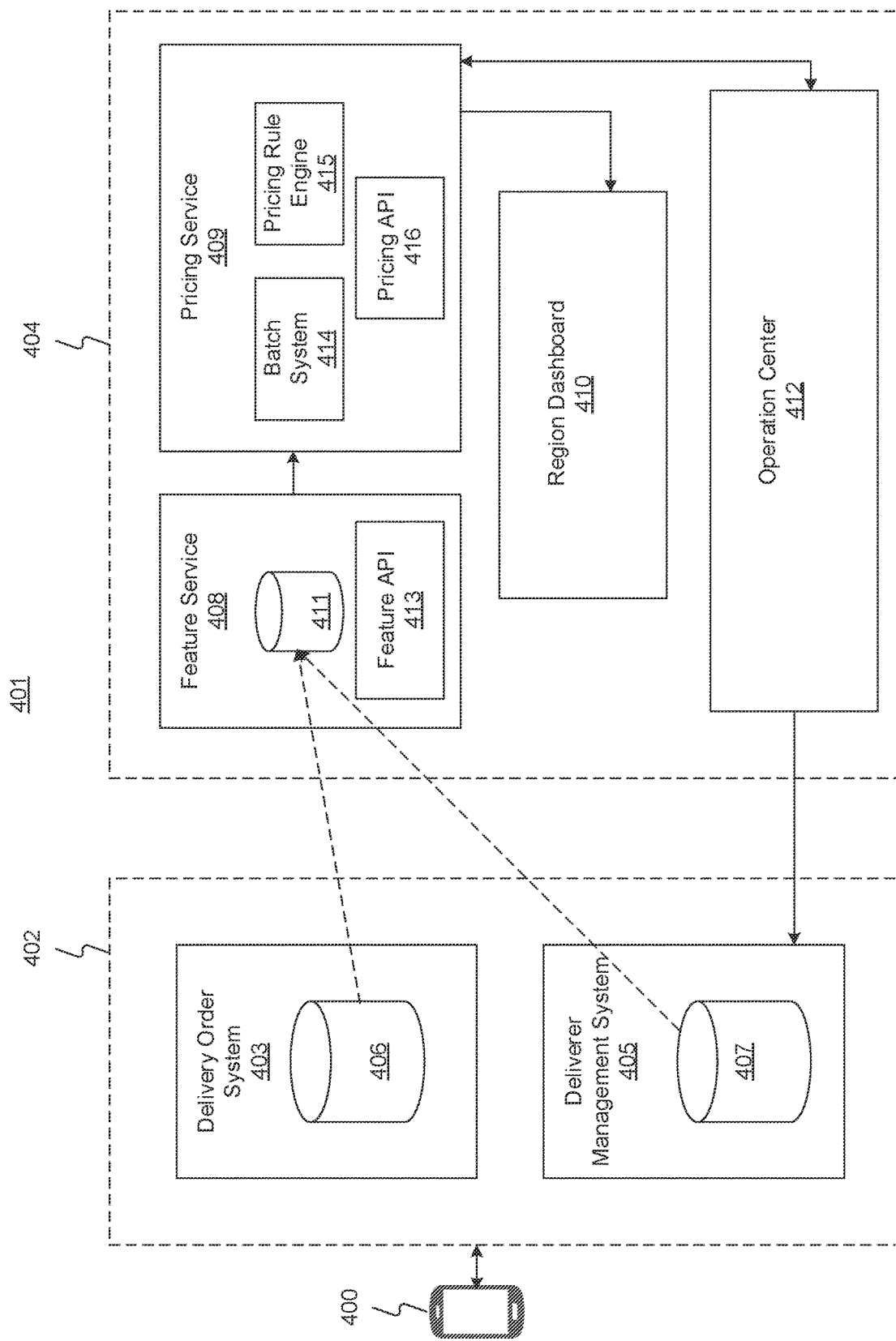
FIG. 4 is a schematic block diagram illustrating components of an exemplary embodiment of a dynamic pricing system, consistent with the disclosed embodiments.

FIG. 4 is a schematic block diagram illustrating components of an exemplary embodiment of a dynamic pricing system 401 for determining and adjusting payout to deliverers. Online services 402 and offline services 404 of dynamic pricing system 401 may be implemented in dynamic pricing system 301 of FIG. 3. As shown in FIG. 4, dynamic pricing system 401 may comprise online services 402 and offline services 404. Online services 402 may require, for example, an Internet connection to operate one or more systems in the online services 402 and allow users, such as customers, deliverers, merchants, or the like to access, share, and modify information stored in the online services 402 at the same time. Offline services 404, on the other hand, may operate without Internet connection. Accordingly, information saved in the offline services 404 may only be accessed by one user at a time, such as when delivery order system 403 or delivery management order system sends a request for information to the offline services 404. Online services 402 may be segregated from offline services 404. Accordingly, when technical failures arise with one of online services 402 and offline services 404, the technical failures may not impact or affect the other of online services 402 and offline services 404. By way of example, online services 402 and offline services 404 may be implemented using different computers.

Online services 402 of dynamic pricing system 401 may comprise a delivery order system 403, database 406 associated with the delivery order system 403, delivery management system 405, and a database 407 associated with the delivery management order system 405. Offline services 404 may comprise a feature service 408, a database 411 associated with the feature service 408, feature application programming interface (API) 413, pricing service 409, batch system 414, pricing rule engine 415, pricing API 416, region dashboard 410, and operation center 412. One or more components of offline service 404 may communicate with one or more components of online service 402 via, for example, network 302. In addition, user device 400, such as a mobile device of a deliverer, mobile device of a customer, and/or a mobile device of a merchant, may communicate with one or more components of dynamic pricing system 401 via network 302.

In some embodiments, delivery order system 403 may comprise one or more processors and one or more databases 406 associated with the delivery order system 403. One or more databases 406, for example, may include, for example, relational or non-relational databases. For example, one or more databases 406 may include Spark™ databases, machine learning databases, Hive™ databases, TensorFlow datasets, Oracle™ databases, Sybase™ databases, or other relational databases or non-relational databases, such as Hadoop™ sequence files, HBase™, or Cassandra™. In some embodiments, one or more databases 406 may comprise Cassandra™ and may be configured to store different types of columns (e.g., different metadata types) for different types of pricing models or algorithms for each geographic region. Additionally, one or more databases 406 may include computing components (e.g., database management system, database server, etc.) configured to receive and process requests for data stored in memory devices of the database(s) and to provide data from the database(s). One or more databases 406 may include NoSQL databases such as HBase, MongoDB™ or Cassandra™. Alternatively, one or more databases 406 may include relational databases such as Oracle, MySQL and Microsoft SQL Server. In some embodiments, one or more databases 406 may take the form of servers, general purpose computers, mainframe computers, or any combination of these components.

One or more databases 406 may store data associated with delivery orders. For example, data stored in one or more databases 406 may include historical data, such as past delivery orders that have been placed by customers, and data associated with each of the past delivery orders. For instance, one or more databases 406 may store features associated with each of the past delivery orders, such as name of the customer who placed each delivery order, delivery address associated with each delivery order, geographic region associated with the delivery address, starting location for each delivery order (e.g., merchant location, delivery order pickup location, etc.), name of the deliverer who fulfilled the delivery order, the estimated time taken to fulfill each delivery order, timestamp of each delivery order, etc. Accordingly, one or more databases 406 may store data such as the time period during which most delivery orders are placed, the time period during which the least number of delivery orders are placed, average amount of time taken to fulfill delivery orders depending on the time of day, the day of the week, the geographic region, or the like.

Dynamic pricing system 401 may also comprise a deliverer management system 405, which may comprise one or more processors and one or more databases 407. Similar to one or more databases 406, one or more database 407 may include, for example, relational or non-relational databases. For example, one or more databases 407 may include Spark™ databases, machine learning databases, Hive™ databases, TensorFlow datasets, Oracle™ databases, Sybase™ databases, or other relational databases or non-relational databases, such as Hadoop™ sequence files, HBase™, or Cassandra™. In some embodiments, one or more databases 407 may comprise Cassandra™ and may be configured to store different types of columns (e.g., different metadata types) for different types of pricing models or algorithms for each geographic region. Additionally, one or more databases 407 may include computing components (e.g., database management system, database server, etc.) configured to receive and process requests for data stored in memory devices of the database(s) and to provide data from the database(s). One or more databases 407 may include NoSQL databases such as HBase, MongoDB™ or Cassandra™. Alternatively, one or more database 407 may include relational databases such as Oracle, MySQL and Microsoft SQL Server. In some embodiments, one or more databases 407 may take the form of servers, general purpose computers, mainframe computers, or any combination of these components.

One or more databases 407 may store information associated with deliverers. For example, one or more databases 407 may store names of deliverers who fulfilled past delivery orders, customer ratings associated with each deliverer, number of delivery orders that each deliverer fulfilled, number of delivery orders rejected by each deliverer, number of delivery orders accepted by each deliverer, total amount of payout each deliverer has earned while fulfilling delivery orders, average payout each deliverer has received while fulfilling delivery orders, the geographic regions in which each deliverer has traveled to fulfill delivery orders, the address associated with each deliverer, the average amount of time taken by each deliverer to fulfill delivery orders, the day(s) of the week or time(s) of the day during which each deliverer is active, the day(s) of the week or time(s) of the day during which each deliverer is inactive, or the like.

Dynamic pricing system 401 may also comprise a feature service 408 configured to extract, determine, and store one or more features associated with delivery orders that may be used to adjust a base fee payout to deliverers. Feature service 408 may comprise one or more processors and one or more databases 411. One or more databases 411 may include, for example, relational databases such as Oracle™ databases, Cassandra™ databases, MySQL, and/or Microsoft SQL Server. In some embodiments, one or more databases 411 may comprise Cassandra™ and may be configured to store different types of columns (e.g., different metadata types) for different types of pricing models or algorithms for each geographic region. Additionally, one or more databases 411 may include computing components (e.g., database management system, database server, etc.) configured to receive and process requests for data stored in memory devices of the database(s) and to provide data from the database(s). In some embodiments, one or more databases 411 may take the form of servers, general purpose computers, mainframe computers, or any combination of these components. One or more databases 411 may comprise a replication of one or more databases 406 and/or one or more databases 407. By way of example, data stored in one or more databases 406 and/or one or more databases 407 may be periodically and/or continuously replicated and cached in one or more databases 411. In some embodiments, data stored in one or more databases 406 and/or one or more databases 407 may be continuously replicated and cached in one or more databases 411 in real-time or in near real-time. Accordingly, even if there are technical failures associated with the online services 402 and one or more databases 406 and/or one or more databases 407 are inaccessible, dynamic pricing system 401 may be fail-safe and may still be able to determine and/or adjust payout to deliverers offline using data stored in one or more databases 411. In other embodiments, when there are technical failures associated with offline services 404, the online services 402 may still be able to operate, thereby preventing any cascading effect to the online services 402.

Feature service 408 may also comprise feature API 413. Feature API 413 may include hardware and/or software that is dedicated to the efficient execution of procedures (e.g., programs, routines, scripts) for supporting its applied application(s). Feature API 413 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model.

Feature API 413 may be configured to access information stored in one or more databases 411 and extract features or feature signals associated with delivery orders that may be used to determine and/or adjust payout to deliverers. Extracted features may comprise, for example, at least one of a decline count associated with each of the delivery orders (e.g., a number of times each delivery order was declined before being accepted by and assigned to a deliverer), distance travelled to fulfill each delivery order, time of day each delivery order was placed, geographic region associated with each delivery order, and/or one or more characteristics associated with a delivery route for each of the delivery orders. One or more characteristics associated with a delivery route may include, for example, distance travelled for each delivery route, time elapsed for each delivery route, amount of traffic associated with each delivery route, whether the delivery route travels through urban, suburban, or isolated areas, whether the delivery route is close to highways, freeways, or local roads, or the like.

Feature API 413 may also be configured to access information stored in one or more databases 411 and extract features or feature signals associated with deliverers. For example, feature API 413 may be configured to extract features associated with deliverers, such as preferred geographic region of each deliverer, minimum accepting payout for each deliverer, expected daily earning of each deliverer, average total payout earned daily for each deliverer, or the like.

Dynamic pricing system 401 may also comprise a pricing service 409 configured to determine a base fee payout to deliverers for fulfilling delivery orders in each geographic region and adjust the base fee, as necessary, in real-time for each geographic region. Accordingly, pricing service 409 may continuously update the payout to deliverers in each geographic region in real-time (e.g., in 1-minute intervals). Pricing service 409 may comprise a batch system 414, a pricing rule engine 415, and a pricing API 416.

In some embodiments, batch system 414 may be configured to retrieve one or more extracted features associated with delivery orders and/or deliverers from feature service 408. Batch system 414 further be configured to retrieve one or more configurations associated with each geographic region. By way of example, one or more configurations associated with each geographic region may comprise a threshold number of deliverers available to fulfill delivery orders and a threshold number of delivery orders that need to be fulfilled. The threshold number of deliverers available to fulfill delivery orders and the threshold number of delivery orders that need to be fulfilled may comprise absolute numbers that are updated in real-time and continuously adjusted based on a number of delivery orders that need to be fulfilled and a number of deliverers available to fulfill delivery orders. Additionally, the threshold number of deliverers available to fulfill delivery orders and the threshold number of delivery orders that need to be fulfilled may vary depending on the geographic region and may be different for each geographic region. In other embodiments, the one or more configurations associated with each geographic region may comprise a number of deliverers in a process of fulfilling delivery orders (and that are soon to be available for fulfilling new delivery orders) and a number of additional delivery orders placed (and that are soon to be assigned to a deliverer). In other embodiments, the one or more configurations associated with each geographic region may comprise vehicle type used to fulfill delivery orders in each geographic region, current time, or the like.

After retrieving one or more extracted features and one or more configurations associated with each geographic region, batch system 414 may be configured to calculate a base fee paid to deliverers for fulfilling delivery orders for each geographic region. Batch system 414 may be configured to update the base fee in real-time (e.g., in 1-minute intervals) based on the retrieved features and retrieved configurations for each geographic region, which may vary depending on the time of the day, day of the week, or the like.

In some embodiments, batch system 414 may be configured to use a pricing model or algorithm to adjust the base fee associated with each geographic region. For example, pricing rule engine 415 may be configured to select a pricing model or algorithm among a plurality of pricing models or algorithms to use to adjust the base fee associated with each geographic region. Batch system 414 may apply the selected pricing model or algorithm to adjust the base fee associated with each geographic region.

In some embodiments, for example, one of the pricing algorithms may compare a current number of deliverers available to fulfill delivery orders to the threshold number of deliverers available to fulfill delivery orders, compare a current number of delivery orders that need to be fulfilled to the threshold number of delivery orders that need to be fulfilled, and determine an increment to adjust the base fee based on the comparisons. Accordingly, if this pricing algorithm is selected by the pricing rule engine 415 based on the geographic region, batch system 414 may apply this pricing algorithm to adjust the base fee. Therefore, batch system 414 may retrieve configurations associated with the geographic region, such as the threshold number of deliverers available to fulfill delivery orders and the threshold number of delivery orders that need to be fulfilled, and apply the selected pricing algorithm, which may compare a current number of deliverers available to fulfill delivery orders to the threshold number of deliverers available to fulfill delivery orders, compare a current number of delivery orders that need to be fulfilled to the threshold number of delivery orders that need to be fulfilled, and determine an increment to adjust the base fee based on the comparisons. Accordingly, batch system 414 may adjust the base fee based on the determined increment and store the adjusted base fee. The adjusted base fee may be stored in pricing API 416 and may be stored and/or displayed on region dashboard 410. As the batch system 414 updates the adjusted base fee in real-time, the adjusted base fee stored in pricing API 416 and/or displayed on region dashboard 410 may also be updated in real-time (e.g., in 1-minute intervals).

In another embodiment, for example, one of the pricing algorithms may determine a ratio of a current number of deliverers available to fulfill delivery orders and the number of deliverers in the process of fulfilling delivery orders to a current number of delivery orders that need to be fulfilled and the number of additional delivery orders placed. The pricing algorithm may use the following equation to determine the ratio:

$$\frac{\text{supply}}{\text{demand}} = \frac{(\text{idle} + soonIdle)}{(\text{backLog} + init)} = \frac{(\text{idle} \times w_{idle} + soonIdle \times w_{soonIdle})}{(\text{backLog} \times w_{backlog} + init \times w_{init})}$$

where "supply" refers to the number of deliverers that may be available to fulfill delivery orders in a geographic region, "demand" refers to the number of delivery orders that need to be fulfilled in a geographic region, "idle" refers to the current number of deliverers available to fulfill delivery orders, "soonIdle" refers to the number of deliverers in the process of fulfilling delivery orders, "backLog" refers to the current number of delivery orders that need to be fulfilled, and "init" refers to the number of additional delivery orders placed. Accordingly, if this pricing algorithm is selected by the pricing rule engine 415 based on the geographic region, batch system 414 may apply this pricing algorithm to adjust the base fee based on the determined ratio. For example, batch system 414 apply the selected pricing algorithm, which may determine a ratio of a current number of deliverers available to fulfill delivery orders and the number of deliverers in the process of fulfilling delivery orders to a current number of delivery orders that need to be fulfilled and the number of additional delivery orders placed, and adjust the base fee by a first amount if the ratio is greater than a predetermined number and adjust the base fee by a second amount if the ratio is lower than the predetermined number. In some embodiments, the current number of deliverers available to fulfill delivery orders, the number of deliverers in the process of fulfilling delivery orders, the current number of delivery orders that need to be fulfilled, and the number of additional delivery orders placed may be weighted. Thereafter, batch system 414 may adjust the base fee based on the determined ratio and store the adjusted base fee. The adjusted base fee may be stored in pricing API 416 and may be stored and/or displayed on region dashboard 410. As the batch system 414 updates the adjusted base fee in real-time, the adjusted base fee stored in pricing API 416 and/or displayed on region dashboard 410 may also be updated in real-time (e.g., in 1-minute intervals).

In another embodiment, one of the pricing algorithms may additionally calculate a distance fee based on a total distance between a starting location and a delivery address associated with each of the plurality of delivery orders and adjust the base fee based on the distance fee. For example, one of the pricing algorithms may determine a ratio of a current number of deliverers available to fulfill delivery orders and the number of deliverers in the process of fulfilling delivery orders to a current number of delivery orders that need to be fulfilled and the number of additional delivery orders placed, adjust the base fee associated with a geographic region based on the determined ratio, calculate a distance fee based on a total distance between a starting location and a delivery address associated with each of the plurality of delivery orders, and adjust the adjusted base fee based on the distance fee. As discussed above, the ratio may be determined based on the following equation:

$$\frac{supply}{demand} = \frac{(idle + soonIdle)}{(backLog + init)} = \frac{(idle \times w_{idle} + soonIdle \times w_{soonIdle})}{(backLog \times w_{backlog} + init \times w_{init})}$$

where "supply" refers to the number of deliverers that may be available to fulfill delivery orders in a geographic region, "demand" refers to the number of delivery orders that need to be fulfilled in a geographic region, "idle" refers to the current number of deliverers available to fulfill delivery orders, "soonIdle" refers to the number of deliverers in the process of fulfilling delivery orders, "backLog" refers to the current number of delivery orders that need to be fulfilled, and "init" refers to the number of additional delivery orders placed. Accordingly, if this pricing algorithm is selected by the pricing rule engine 415 based on the geographic region, batch system 414 may apply this pricing algorithm to adjust the base fee based on the determined ratio and further adjust the adjusted base fee based on the calculated distance fee in order to not only adjust the base payout based on market conditions, but also adjust the base payout based on total delivery distances. In some embodiments, the distance fee may be weighted. Thereafter, the adjusted base fee may be stored in pricing API 416 and may be stored and/or displayed on region dashboard 410. As the batch system 414 updates the adjusted base fee in real-time, the adjusted base fee stored in pricing API 416 and/or displayed on region dashboard 410 may also be updated in real-time (e.g., in 1-minute intervals).

In some embodiments, one of the pricing algorithms may implement a machine learning algorithm to predict at least one of a number of delivery orders that will need to be fulfilled or a future number of deliverers that will be available to fulfill delivery orders at a particular time and adjust the base fee based on the prediction. For example, one of the pricing algorithms may implement the following time series machine learning algorithms using historical data associated with past delivery orders and/or past deliverers to predict a number of delivery orders that will need to be fulfilled or a future number of deliverers that will be available to fulfill delivery orders at a particular time in a particular geographic region, for example, in the next 15 minutes.

$$demand_{t+15min} = f(demand_t, regionId, hour_{t+15min}, day_{of\ week}, weather)$$

$$supply_{elasticity} = f(supply_t, price_{current}, regional, hour_t, day_{of\ week}, weather)$$

$$demand_{t+15min} = supply_{target} = f(Supply_{elasticity}, price_{target})$$

where "$supply_{elasticity}$" refers to the increase in payout that is necessary to acquire additional deliverers to fulfill delivery orders in a geographic region, "$demand_t$" refers to the number of delivery orders that need to be fulfilled in a geographic region at a particular time t, "$demand_{t+15min}$" refers to the number of delivery orders that will need to be fulfilled in a geographic region in the next 15 minutes, "regionId" refers to an identifier assigned to a geographic region, "$price_{current}$" refers to the current payout to deliverers for fulfilling delivery orders, "regional" refers to the base fee in a geographic region, "$supply_{target}$" refers to target number of deliverers that will be needed to fulfill delivery orders in a geographic region in the next 15 minutes, and "$price_{target}$" refers to the target payout to deliverers. Based on the prediction, batch system 414 may preemptively adjust the base fee to account for the number of delivery orders that will need to be fulfilled and/or the future number of deliverers that will be available to fulfill delivery orders at a particular time in a particular geographic region. Thereafter, the adjusted base fee may be stored in pricing API 416 and may be stored and/or displayed on region dashboard 410. As the batch system 414 updates the adjusted base fee in real-time, the adjusted base fee stored in pricing API 416 and/or displayed on region dashboard 410 may also be updated in real-time (e.g., in 1-minute intervals).

In some embodiments, the machine learning algorithm used to predict at least one of a number of delivery orders that will need to be fulfilled or a future number of deliverers that will be available to fulfill delivery orders at a particular time in a particular geographic region may be trained using data stored in one or more databases 406, 407, and 411. For example, the machine learning algorithm may be trained using historical data associated with past delivery orders or past activities of deliverers to predict demand in a geographic region, such as the number of delivery orders that need to be fulfilled in a geographic region, and/or supply in a geographic region, such as the number of deliverers that may be available to fulfill delivery orders in a geographic region. In some embodiments, batch system 414 may implement the machine learning algorithm to predict demand in a geographic region, such as the number of delivery orders that may need to be fulfilled in a geographic region in the future, and preemptively adjust the payout to deliverers (e.g., increase the price paid to deliverers) to ensure that a sufficient number of deliverers will be available to fulfill the delivery orders in the geographic region. In some embodiment, batch system 414 may also preemptively adjust the payout to deliverers (e.g., decrease the price paid to deliverers) to reduce the number of deliverers that will be available to fulfill delivery orders in the future, particularly when the machine learning algorithm is implemented to predict that the number of delivery orders will decrease in the future.

In some embodiments, pricing service 409 may use the machine learning algorithm to shape demand in the future. For example, pricing service 409 may implement the machine learning algorithm to predict that, within a particular time period in the future, the number of deliverers available to fulfill delivery orders will significantly decrease in a particular geographic region. Accordingly, pricing service 409 may send instructions to operation center 412, which may then send instructions to deliverer management system 405 and/or delivery order management system 403 to use a ranking algorithm to arrange and/or rearrange the list of merchants that are displayed on a user interface of user device 400. Accordingly, one or more processors of deliverer management system 405 and/or delivery order management system 403 may use a ranking algorithm to rearrange the list of merchants such that merchants within the particular geographic region and/or in close proximity to the particular geographic region is displayed at the top of the user interface to drive demand to those nearby merchants. Merchants that are farther away from the particular geographic region may be ranked lower and displayed at the bottom of the user interface (or not displayed at all) to reduce the likelihood of customers placing delivery orders at the merchants that are farther away from the particular geographic region. Accordingly, pricing service 409 may implement a machine learning algorithm to match demand in a geographic region, such as the number of delivery orders that need to be fulfilled in a geographic region, with supply in a geographic region, such as the number of deliverers that may be available to fulfill delivery orders in a geographic region.

In some embodiments, pricing API 416 may include hardware and/or software that is dedicated to the efficient execution of procedures (e.g., programs, routines, scripts) for supporting its applied application(s). Pricing API 416 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. In some embodiments, pricing API 416 may not only be configured to cache, for example by Cassandra™, the updated adjusted base fee, but may also be configured to cache the selected pricing algorithm that was used to adjust the base fee for each geographic region. Accordingly, batch system 414 may be configured to efficiently update the adjusted base fee using the cached pricing algorithm. Additionally, or alternatively, since the latest adjusted base fee and the selected pricing algorithm are cached in pricing API 416, even when there are failures with one or more components of dynamic pricing system 401, pricing service 409 may be configured to return fallback values, such as the cached latest payout information, thereby preventing any cascading effect to other parts of dynamic pricing system 401.

Dynamic pricing system 401 may also comprise a region dashboard 410. Region dashboard 410 may retrieve the adjusted base fee in real-time from pricing service 409 and maintain the latest payout information for each geographic region. In some embodiments, region dashboard 410 may be implemented as a search engine, such as Elasticsearch™ or Kibana™ and, thus, the latest payout information for each geographic region may be searched and retrieved offline. For example, the latest payout information for each geographic region may be retrieved without Internet connection when delivery order system 403 or delivery management order system sends a request for the latest payout information to the region dashboard 410. In some embodiments, dynamic pricing system 401 may comprise an operation center 412 that may be configured to retrieve the latest payout information from pricing service 409 and transmit the latest payout information to deliverer management system 405. Deliverer management system 405 may then be configured to transmit and send for display on a user interface of user device 400 the latest payout information, including the adjusted base fee paid to deliverers for fulfilling delivery orders in each geographic region. By way of example, user interface of user device 400 may be configured to display a map of one or more geographic regions with an icon superimposed on each geographic region. The icon superimposed on each geographic region may be configured to display the adjusted payout for fulling delivery orders. The map may be updated in real-time so as to display the latest adjusted payout for each geographic region.

Figure 5:
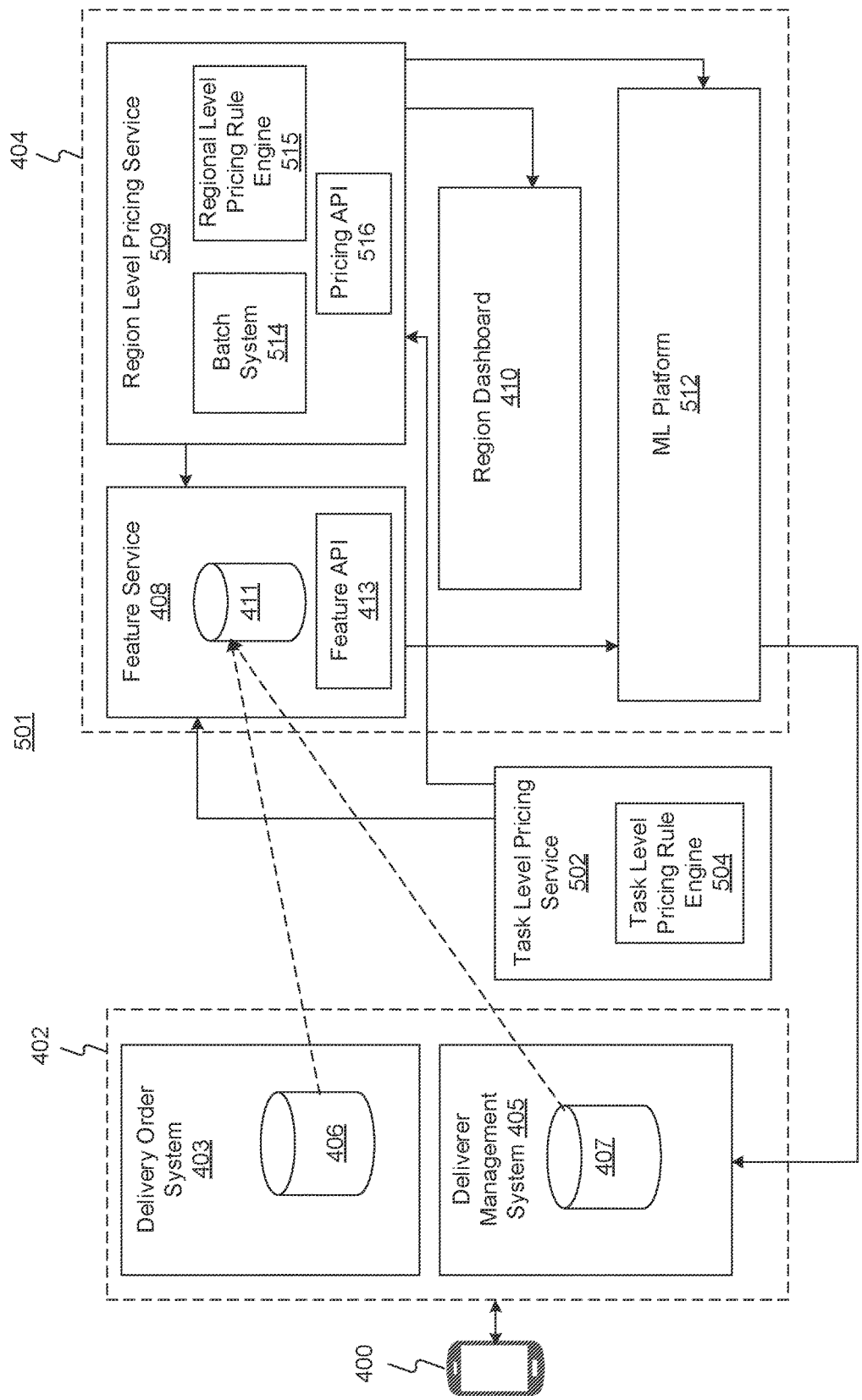
FIG. 5 is a schematic block diagram illustrating components of another exemplary embodiment of a dynamic pricing system, consistent with the disclosed embodiments.

Referring now to FIG. 5, FIG. 5 illustrates a schematic block diagram illustrating components of another exemplary embodiment of a dynamic pricing system 501 for determining and adjusting payout to deliverers. Online services 402 and offline services 404 of dynamic pricing system 501 may be implemented in dynamic pricing system 301 of FIG. 3. As shown in FIG. 5 and similar to dynamic pricing system 401 of FIG. 4, dynamic pricing system 501 may comprise online services 402 and offline services 404. Online services 402 may require, for example, an Internet connection to operate one or more systems in the online services 402 and allow users, such as customers, deliverers, merchants, or the like to access, share, and modify information stored in the online services 402 at the same time. Offline services 404, on the other hand, may operate without Internet connection. Accordingly, information saved in the offline services 404 may only be accessed by one user at a time, such as when delivery order system 403 or delivery management order system sends a request for information to the offline services 404. Online services 402 may be segregated from offline services 404. Accordingly, when technical failures arise with one of online services 402 and offline services 404, the technical failures may not impact or affect the other of online services 402 and offline services 404. By way of example, online services 402 and offline services 404 may be implemented using different computers.

Online services 402 of dynamic pricing system 401 may comprise a delivery order system 403, database 406 associated with the delivery order system 403, delivery management system 405, and a database 407 associated with the delivery management order system 405. Offline services 404 may comprise a feature service 408, a database 411 associated with the feature service 408, feature application programming interface (API) 413, regional level pricing service 509, batch system 514, pricing rule engine 515, pricing API 516, region dashboard 410, and machine learning (ML) platform 512. One or more components of offline service 404 may communicate with one or more components of online service 402 via, for example, network 302. In addition, user device 400, such as a mobile device of a deliverer, mobile device of a customer, and/or a mobile device of a merchant, may communicate with one or more components of dynamic pricing system 501 via network 302.

Delivery order system 403, one or more databases 406 associated with delivery order system 403, deliverer management system 405, one or more databases 407 associated with deliverer management system 405, feature service 408, one or more databases 411 associated with feature service 408, feature API 413, and region dashboard 410 of dynamic pricing system 501 may be the same as the respective components in dynamic pricing system 401 of FIG. 4 and, thus, descriptions of these components will be omitted. However, unlike dynamic pricing system 401 of FIG. 4, dynamic pricing system 501 may further comprise a task level pricing service 502, a regional level pricing service 509, and a machine learning platform 512. Accordingly, the tasks of pricing service 409 may be separated into a regional level pricing service 509 and a task level pricing service 502.

Regional level pricing service 509 may be configured to determine a regional level base fee payout to deliverers for fulfilling delivery orders in each geographic region and adjust the regional level base fee, as necessary, in real-time. Accordingly, regional level pricing service 509 may continuously update the payout to deliverers in each geographic region in real-time (e.g., in 1-minute intervals). Regional level pricing service 509 may comprise a batch system 514, a regional level pricing rule engine 515, and a pricing API 516.

In some embodiments, batch system 514 may be configured to retrieve one or more configurations associated with each geographic region. By way of example, one or more configurations associated with each geographic region may comprise a threshold number of deliverers available to fulfill delivery orders and a threshold number of delivery orders that need to be fulfilled. The threshold number of deliverers available to fulfill delivery orders and the threshold number of delivery orders that need to be fulfilled may comprise absolute numbers that are updated in real-time and continuously adjusted based on a number of delivery orders that need to be fulfilled and a number of deliverers available to fulfill delivery orders. Additionally, the threshold number of deliverers available to fulfill delivery orders and the threshold number of delivery orders that need to be fulfilled may vary depending on the geographic region and may be different for each geographic region. In other embodiments, the one or more configurations associated with each geographic region may comprise a number of deliverers in a process of fulfilling delivery orders (and that are soon to be available for fulfilling new delivery orders) and a number of additional delivery orders placed (and that are soon to be assigned to a deliverer). In other embodiments, the one or more configurations associated with each geographic region may comprise vehicle type used to fulfill delivery orders in each geographic region, current time, or the like.

After retrieving one or more configurations associated with each geographic region, batch system 514 may be configured to calculate a base fee paid to deliverers for fulfilling delivery orders for each geographic region. Batch system 514 may be configured to update the base fee in real-time (e.g., in 1-minute intervals) based on the retrieved configurations for each geographic region, which may vary depending on the time of the day, day of the week, or the like.

In some embodiments, batch system 514 may be configured to use a pricing model or algorithm to adjust the base fee associated with each geographic region. For example, regional level pricing rule engine 515 may be configured to select a pricing model or algorithm among a plurality of pricing models or algorithms to use to adjust the base fee associated with each geographic region. Batch system 514 may apply the selected pricing model or algorithm to adjust the base fee associated with each geographic region. In some embodiments, for example, one of the pricing algorithms may compare a current number of deliverers available to fulfill delivery orders to the threshold number of deliverers available to fulfill delivery orders, compare a current number of delivery orders that need to be fulfilled to the threshold number of delivery orders that need to be fulfilled, and determine an increment to adjust the base fee based on the comparisons. Accordingly, if this pricing algorithm is selected by the regional level pricing rule engine 515 based on the geographic region, batch system 514 may apply this pricing algorithm to adjust the base fee. Therefore, batch system 514 may retrieve configurations associated with the geographic region, such as the threshold number of deliverers available to fulfill delivery orders and the threshold number of delivery orders that need to be fulfilled, and apply the selected pricing algorithm, which may compare a current number of deliverers available to fulfill delivery orders to the threshold number of deliverers available to fulfill delivery orders, compare a current number of delivery orders that need to be fulfilled to the threshold number of delivery orders that need to be fulfilled, and determine an increment to adjust the base fee based on the comparisons. Accordingly, batch system 514 may adjust the base fee based on the determined increment and store the adjusted base fee. The adjusted base fee may be stored in pricing API 516 and may be stored and/or displayed on region dashboard 410. As the batch system 514 updates the adjusted base fee in real-time, the adjusted base fee stored in pricing API 516 and/or displayed on region dashboard 410 may also be updated in real-time (e.g., in 1-minute intervals).

In another embodiment, for example, one of the pricing algorithms may determine a ratio of a current number of deliverers available to fulfill delivery orders and the number of deliverers in the process of fulfilling delivery orders to a current number of delivery orders that need to be fulfilled and the number of additional delivery orders placed. The pricing algorithm may use the following equation to determine the ratio:

$$\frac{supply}{demand} = \frac{(idle + soonIdle)}{(backLog + init)} = \frac{(idle \times w_{idle} + soonIdle \times w_{soonIdle})}{(backLog \times w_{backlog} + init \times w_{init})}$$

where "supply" refers to the number of deliverers that may be available to fulfill delivery orders in a geographic region, "demand" refers to the number of delivery orders that need to be fulfilled in a geographic region, "idle" refers to the current number of deliverers available to fulfill delivery orders, "soonIdle" refers to the number of deliverers in the process of fulfilling delivery orders, "backLog" refers to the current number of delivery orders that need to be fulfilled, and "init" refers to the number of additional delivery orders placed. Accordingly, if this pricing algorithm is selected by the regional level pricing rule engine 515 based on the geographic region, batch system 514 may apply this pricing algorithm to adjust the base fee based on the determined ratio. For example, batch system 514 apply the selected pricing algorithm, which may determine a ratio of a current number of deliverers available to fulfill delivery orders and the number of deliverers in the process of fulfilling delivery orders to a current number of delivery orders that need to be fulfilled and the number of additional delivery orders placed, and adjust the base fee by a first amount if the ratio is greater than a predetermined number and adjust the base fee by a second amount if the ratio is lower than the predetermined number. In some embodiments, the current number of deliverers available to fulfill delivery orders, the number of deliverers in the process of fulfilling delivery orders, the current number of delivery orders that need to be fulfilled, and the number of additional delivery orders placed may be weighted. Thereafter, batch system 514 may adjust the base fee based on the determined ratio and store the adjusted base fee. The adjusted base fee may be stored in pricing API 516 and may be stored and/or displayed on region dashboard 410. As the batch system 514 updates the adjusted base fee in real-time, the adjusted base fee stored in pricing API 516 and/or displayed on region dashboard 410 may also be updated in real-time (e.g., in 1-minute intervals).

In another embodiment, one of the pricing algorithms may additionally calculate a distance fee based on a total distance between a starting location and a delivery address associated with each of the plurality of delivery orders and adjust the base fee based on the distance fee. For example, one of the pricing algorithms may determine a ratio of a current number of deliverers available to fulfill delivery orders and the number of deliverers in the process of fulfilling delivery orders to a current number of delivery orders that need to be fulfilled and the number of additional delivery orders placed, adjust the base fee associated with a geographic region based on the determined ratio, calculate a distance fee based on a total distance between a starting location and a delivery address associated with each of the plurality of delivery orders, and adjust the adjusted base fee based on the distance fee. As discussed above, the ratio may be determined based on the following equation:

$$\frac{\text{supply}}{\text{demand}} = \frac{(\text{idle} + \text{soonIdle})}{(\text{backLog} + \text{init})} = \frac{(\text{idle} \times w_{idle} + \text{soonIdle} \times w_{soonIdle})}{(\text{backLog} \times w_{backlog} + \text{init} \times w_{init})}$$

where "supply" refers to the number of deliverers that may be available to fulfill delivery orders in a geographic region, "demand" refers to the number of delivery orders that need to be fulfilled in a geographic region, "idle" refers to the current number of deliverers available to fulfill delivery orders, "soonIdle" refers to the number of deliverers in the process of fulfilling delivery orders, "backLog" refers to the current number of delivery orders that need to be fulfilled, and "init" refers to the number of additional delivery orders placed. Accordingly, if this pricing algorithm is selected by the regional level pricing rule engine 515 based on the geographic region, batch system 514 may apply this pricing algorithm to adjust the base fee based on the determined ratio and further adjust the adjusted base fee based on the calculated distance fee in order to not only adjust the base payout based on market conditions, but also adjust the base payout based on total delivery distances. In some embodiments, the distance fee may be weighted. Thereafter, the adjusted base fee may be stored in pricing API 516 and may be stored and/or displayed on region dashboard 410. As the batch system 514 updates the adjusted base fee in real-time, the adjusted base fee stored in pricing API 516 and/or displayed on region dashboard 410 may also be updated in real-time (e.g., in 1-minute intervals).

In some embodiments, one of the pricing algorithms may implement a machine learning algorithm stored in machine learning platform 512 to predict at least one of a number of delivery orders that will need to be fulfilled or a future number of deliverers that will be available to fulfill delivery orders at a particular time and adjust the base fee based on the prediction. For example, one of the pricing algorithms may implement the following time series machine learning algorithms using historical data associated with past delivery orders and/or past deliverers to predict a number of delivery orders that will need to be fulfilled or a future number of deliverers that will be available to fulfill delivery orders at a particular time in a particular geographic region, for example, in the next 15.

$$\text{demand}_{t+15min} = f(\text{demand}_t, \text{regionId}, \text{hour}_{t+15min}, \text{day}_{of\,week}, \text{weather})$$

$$\text{supply}_{elasticity} = f(\text{supply}_t, \text{price}_{current}, \text{regional}, \text{hour}_t, \text{day}_{of\,week}, \text{weather})$$

$$\text{demand}_{t+15min} = \text{supply}_{target} = f(\text{Supply}_{elasticity}, \text{price}_{target})$$

where "$\text{supply}_{elasticity}$" refers to the increase in payout that is necessary to acquire additional deliverers to fulfill delivery orders in a geographic region, "$\text{demand}_t$" refers to the number of delivery orders that need to be fulfilled in a geographic region at a particular time t, "$\text{demand}_{t+15min}$" refers to the number of delivery orders that will need to be fulfilled in a geographic region in the next 15 minutes, "regionId" refers to an identifier assigned to a geographic region, "$\text{price}_{current}$" refers to the current payout to deliverers for fulfilling delivery orders, "regional" refers to the base fee in a geographic region, "$\text{supply}_{target}$" refers to target number of deliverers that will be needed to fulfill delivery orders in a geographic region in the next 15 minutes, and "$\text{price}_{target}$" refers to the target payout to deliverers. Based on the prediction, batch system 514 may preemptively adjust the base fee to account for the number of delivery orders that will need to be fulfilled and/or the future number of deliverers that will be available to fulfill delivery orders at a particular time in a particular geographic region. Thereafter, the adjusted base fee may be stored in pricing API 516 and may be stored and/or displayed on region dashboard 410. As the batch system 514 updates the adjusted base fee in real-time, the adjusted base fee stored in pricing API 516 and/or displayed on region dashboard 410 may also be updated in real-time (e.g., in 1-minute intervals).

In some embodiments, machine learning platform 512 may store one or more machine learning algorithms used to dynamically adjust payout to deliverers. For example, a machine learning algorithm stored in machine learning platform 512 may be used to predict at least one of a number of delivery orders that will need to be fulfilled or a future number of deliverers that will be available to fulfill delivery orders at a particular time in a particular geographic region. The machine learning algorithm may be trained using data stored in one or more databases 406, 407, and 411. For example, the machine learning algorithm may be trained using historical data associated with past delivery orders or past activities of deliverers to predict demand in a geographic region, such as the number of delivery orders that need to be fulfilled in a geographic region, and/or supply in a geographic region, such as the number of deliverers that may be available to fulfill delivery orders in a geographic region. In some embodiments, batch system 514 may retrieve the machine learning algorithm from machine learning platform 512 and implement the machine learning algorithm to predict demand in a geographic region, such as the number of delivery orders that may need to be fulfilled in a geographic region in the future, and preemptively adjust the payout to deliverers (e.g., increase the price paid to deliverers) to ensure that a sufficient number of deliverers will be available to fulfill the delivery orders in the geographic region. In some embodiment, batch system 514 may also preemptively adjust the payout to deliverers (e.g., decrease the price paid to deliverers) to reduce the number of deliverers that will be available to fulfill delivery orders in the future, particularly when the machine learning algorithm is implemented to predict that the number of delivery orders will decrease in the future.

In some embodiments, regional level pricing service 509 and/or task level pricing service 502 may use one or more machine learning algorithms stored in machine learning platform 512 to shape demand in the future. On a regional level, for example, regional level pricing service 509 may implement the machine learning algorithm to predict that, within a particular time period in the future, the number of deliverers available to fulfill delivery orders will significantly decrease in a particular geographic region. Accordingly, regional level pricing service 509 and/or task level pricing service 502 may send instructions to deliverer management system 405 and/or delivery order management system 403 to use a ranking algorithm to arrange and/or rearrange the list of merchants that are displayed on a user interface of user device 400. Accordingly, one or more processors of deliverer management system 405 and/or delivery order management system 403 may use a ranking algorithm to rearrange the list of merchants such that merchants within the particular geographic region and/or in close proximity to the particular geographic region is displayed at the top of the user interface to drive demand to those nearby merchants. Merchants that are farther away from the particular geographic region may be ranked lower and displayed at the bottom of the user interface (or not displayed at all) to reduce the likelihood of customers placing delivery orders at the merchants that are farther away from the particular geographic region. Accordingly, regional level pricing service 509 and/or task level pricing service 502 may implement a machine learning algorithm to match demand in a geographic region, such as the number of delivery orders that need to be fulfilled in a geographic region, with supply in a geographic region, such as the number of deliverers that may be available to fulfill delivery orders in a geographic region.

In some embodiments, pricing API 516 may include hardware and/or software that is dedicated to the efficient execution of procedures (e.g., programs, routines, scripts) for supporting its applied application(s). Pricing API 416 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. In some embodiments, pricing API 516 may not only be configured to cache, for example by Cassandra™, the updated adjusted base fee, but may also be configured to cache the selected pricing algorithm that was used to adjust the base fee for each geographic region. Accordingly, batch system 514 may be configured to efficiently update the adjusted base fee using the cached pricing algorithm. Additionally, or alternatively, since the latest adjusted base fee and the selected pricing algorithm are cached in pricing API 516, even when there are failures with one or more components of dynamic pricing system 501, regional level pricing service 519 may be configured to return fallback values, such as the cached latest payout information, thereby preventing any cascading effect to other parts of dynamic pricing system 501.

In other embodiments, pricing API 516 may be configured to cache pricing algorithm-to-geographic region mapping (e.g., mapping of which pricing algorithm was previously selected to adjust the base fee in each geographic region). Accordingly, for each geographic region, batch system 514 may be configured to efficiently adjust the base fee using the pricing algorithm mapped to each respective geographic region and cached in pricing API 516. To ensure that the appropriate pricing algorithm is selected, cached, and used to adjust the base fee in each geographic region, a switchback test may be implemented by API 516. The switchback test may configure regional level pricing rule engine 515 and batch system 514 such that one particular pricing algorithm is continuously used to adjust the base fee in a particular region for a predetermined period of time (e.g., 3 hours). After the predetermined period of time has elapsed, the switchback test may configure regional level pricing rule engine 515 and batch system 514 to switch to another, different pricing algorithm to adjust the base fee in the particular region for the predetermined period of time (e.g., 3 hours). Switching to another pricing algorithm may be repeated until each of the pricing algorithms has been used to adjust the base fee in the same region for the same period of time. Data points may be gathered during the entirety of the switchback assessment to evaluate the performance of each pricing algorithm and determine which pricing algorithm, of the plurality of pricing algorithms, best adjust the base fee without any network effect.

In some embodiments, task level pricing service 502 may comprise a task level pricing rule engine 504 configured to retrieve one or more features associated with delivery orders and/or deliverers from feature API 413 of feature service 408, retrieve base fee information associated with each geographic region from regional level pricing service 509. Base fee information retrieved from regional level pricing service 509 may already be adjusted on a regional level based on one or more configurations associated with each geographic region. Task level pricing rule engine 504 may also be configured to retrieve task level pricing algorithms from a repository in machine learning platform 512. Accordingly, task level pricing service 502 may be configured to further adjust the base fee in addition to the regional level adjustment to balance demand in a geographic region, such as the number of delivery orders that need to be fulfilled in a geographic region, and supply in a geographic region, such as the number of deliverers that may be available to fulfill delivery orders in a geographic region.

Task level pricing rule engine 504 may be configured to select, among a plurality of task level pricing algorithms, a task level pricing algorithm to further adjust the base fee based on features associated with delivery orders. One or more features associated with delivery orders may comprise, for example, at least one of a decline count associated with each of the delivery orders (e.g., a number of times each delivery order was declined before being accepted by and assigned to a deliverer), distance travelled to fulfill each delivery order, time of day each delivery order was placed, geographic region associated with each delivery order, and/ or one or more characteristics associated with a delivery route for each of the delivery orders. One or more characteristics associated with a delivery route may include, for example, distance travelled for each delivery route, time elapsed for each delivery route, amount of traffic associated with each delivery route, whether the delivery route travels through urban, suburban, or isolated areas, whether the delivery route is close to highways, freeways, or local roads, or the like. To minimize the probability of declination of a delivery order offer to a deliverer, the selected task level pricing algorithm may increase or decrease the base fee based on the one or more features associated with each delivery order to incentivize a deliverer to accept the delivery order.

In other embodiments, the selected task level pricing algorithm may further account for one or more features associated with deliverers. One or more features associated with deliverers may comprise, for example, preferred geographic region of each deliverer, minimum accepting payout for each deliverer, expected daily earning of each deliverer, average total payout earned daily for each deliverer, or the like. Accordingly, the task level pricing algorithm may increase or decrease the base fee based on one or more features associated each delivery order and one or more features associated with each deliverer.

As shown in FIG. 5, task level pricing service 502 may be implemented between online services 402 and offline services 404. Task level pricing service 502 may be configured to determine the best payout to deliverers for each individual delivery order by further adjusting a base fee, for each individual delivery order, that has already been adjusted on a regional level by regional level pricing service 509 based on one or more configurations associated with a geographic region. Task level pricing service 502 may be configured to bridge between online services 402 and offline services 404 to ensure that the offline services 404 do not impact the online services 402 such that, for example, the delivery order management system 403 is designed to be fail-safe. By way of example, when there is a failure with task level pricing service 502 with API timeout limit, delivery order management system 403 may still be able to retrieve deliverer payout information. For example, delivery order management system 403 may still be able to retrieve a fallback value, such as the cached latest payout information, thereby preventing any cascading effect to online services 402.

Figure 6:
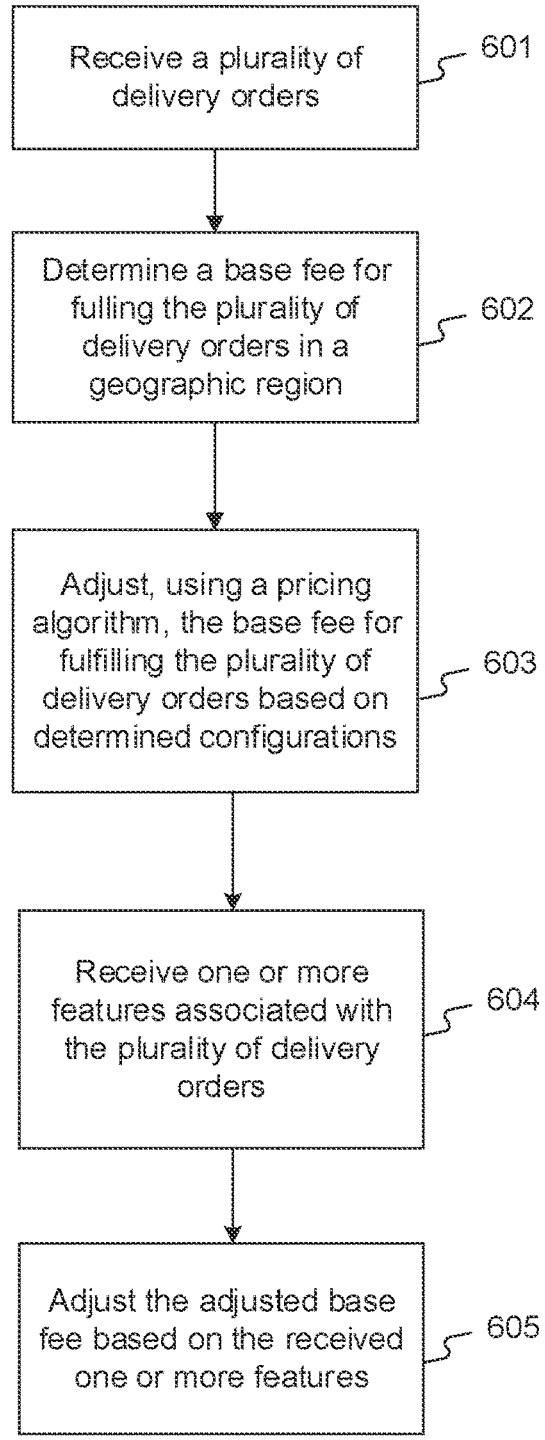
FIG. 6 is a flowchart illustrating an exemplary embodiment of a method for dynamically adjusting payout to deliverers, consistent with the disclosed embodiments.

Referring now to FIG. 6, a diagram illustrating an exemplary embodiment of a method 600 for dynamically adjusting payout to deliverers is shown. This exemplary method is provided by way of example. Method 600 shown in FIG. 6 can be executed or otherwise performed by one or more combinations of various systems. Method 600 as described below may be carried out by dynamic pricing system 301, as shown in FIG. 3, by way of example, and various elements of that system are referenced in explaining the method of FIG. 6. In other embodiments, method 600 as described below may be carried out by portions of dynamic pricing system 401, as shown in FIG. 4, or portions of dynamic pricing system 501, as shown in FIG. 5. Each block shown in FIG. 6 represents one or more processes, methods, or subroutines in the exemplary method 600. Referring to FIG. 6, exemplary method 600 may begin at block 601.

At block 601, one or more processors 305 may be configured to receive a plurality of delivery orders. For example, one or more processors 305 may be configured to receive delivery orders from one or more customers, via a software application program running on one or more user devices of one or more customers. The delivery orders may each be associated with a delivery address in a particular geographic region. The geographic region may also be associated with a plurality of configurations. For example, the plurality of configurations associated with the geographic region may comprise a threshold number of deliverers available to fulfill delivery orders and a threshold number of delivery orders that need to be fulfilled. The threshold number of deliverers available to fulfill delivery orders and the threshold number of delivery orders that need to be fulfilled may comprise absolute numbers that are updated in real-time and continuously adjusted based on a number of delivery orders that need to be fulfilled and a number of deliverers available to fulfill delivery orders. Additionally, the threshold number of deliverers available to fulfill delivery orders and the threshold number of delivery orders that need to be fulfilled may vary depending on the geographic region and may be different for each geographic region. In other embodiments, the plurality of configurations associated with each geographic region may comprise a number of deliverers in a process of fulfilling delivery orders (and that are soon to be available for fulfilling new delivery orders) and a number of additional delivery orders placed (and that are soon to be assigned to a deliverer). In other embodiments, the plurality of configurations associated with each geographic region may comprise vehicle type used to fulfill delivery orders in each geographic region, current time, or the like.

After receiving the plurality of delivery orders, method 600 may proceed to block 602. At block 602, one or more processors 305 may determine a base fee for fulfilling the delivery orders in the geographic region based on the plurality of configurations associated with the geographic region. By way of example, one or more processors 305 may be configured to implement a batch system, such as batch system 414 of FIG. 4 or batch system 514 of FIG. 5, to calculate a base fee paid to deliverers for fulfilling the delivery orders in the geographic region.

After determining the base fee associated with the geographic region, method 600 may proceed to block 603, at which one or more processors 305 may be configured to adjust the base fee using a pricing algorithm. In some embodiments, one or more processors 305 may implement a pricing rule engine, such as pricing rule engine 415 of FIG. 4 or regional level pricing rule engine 515 of FIG. 5, which may be configured to select a pricing model or algorithm among a plurality of pricing models or algorithms to use to adjust the base fee associated with the geographic region. Depending on the pricing algorithm selected, one or more processors 305 may adjust the base fee associated with the geographic region based on, for example, a comparison of a current number of deliverers available to fulfill delivery orders to the threshold number of deliverers available to fulfill delivery orders in the geographic region, a comparison of a current number of delivery orders that need to be fulfilled to the threshold number of delivery orders that need to be fulfilled in the geographic region, a ratio of a current number of deliverers available to fulfill delivery orders and the number of deliverers in the process of fulfilling delivery orders to a current number of delivery orders that need to be fulfilled and the number of additional delivery orders placed in the geographic region, and/or a distance fee based on a total distance between a starting location and a delivery address associated with each of the plurality of delivery orders.

Method 600 may further proceed to block 604. At block 604, one or more processors 305 may receive one or more features associated with the delivery orders. One or more features may comprise, for example, at least one of a decline count associated with each of the delivery orders (e.g., a number of times each delivery order was declined before being accepted by and assigned to a deliverer), distance travelled to fulfill each delivery order, time of day each delivery order was placed, geographic region associated with each delivery order, and/or one or more characteristics associated with a delivery route for each of the delivery orders. One or more characteristics associated with a delivery route may include, for example, distance travelled for each delivery route, time elapsed for each delivery route, amount of traffic associated with each delivery route, whether the delivery route travels through urban, suburban, or isolated areas, whether the delivery route is close to highways, freeways, or local roads, or the like. Additionally, or alternatively, features may also be associated with deliverers, such as preferred geographic region of each deliverer, minimum accepting payout for each deliverer, expected daily earning of each deliverer, average total payout earned daily for each deliverer, or the like.

After retrieving one or more features associated with the delivery orders, method 600 may proceed to block 605. At block 605, one or more processors 305 may be configured to adjust the adjusted base fee based on the one or more features. By way of example, to minimize the probability of declination of delivery order offers to deliverers, one or more processors 305 may increase or decrease the adjusted base fee that has been adjusted on a regional level based on the one or more features associated with the delivery orders to incentivize deliverers to accept the delivery orders.

In other embodiments, one or more processors 305 may further account for one or more features associated with deliverers. One or more features associated with deliverers may comprise, for example, preferred geographic region of each deliverer, minimum accepting payout for each deliverer, expected daily earning of each deliverer, average total payout earned daily for each deliverer, or the like. Accordingly, one or more processors 305 may increase or decrease the adjusted base fee based on one or more features associated deliverers to further minimize the probability of declination of delivery order offers to deliverers.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for dynamically adjusting payout to deliverers, the computer-implemented system comprising:
   one or more online services;
   one or more offline services separate from the one or more online services, the one or more offline services comprising a batch system and a pricing rule engine;
   a memory storing instructions; and
   at least one processor configured to execute the instructions to:
      receive a plurality of delivery orders, wherein each of the plurality of delivery orders is associated with a delivery address in a geographic region, and wherein the geographic region is associated with a plurality of configurations;
      determine a base fee for fulfilling the plurality of delivery orders in the geographic region based on the plurality of configurations associated with the geographic region;
      adjust, by the batch system using a pricing algorithm, the base fee for fulfilling the plurality of delivery orders based on the plurality of configurations;
      receive one or more features associated with the plurality of delivery orders, wherein the one or more features comprise at least one of a time of day each delivery order was placed or a geographic region associated with each delivery order; and
      adjust the adjusted base fee based on the received one or more features,
      wherein the plurality of configurations used to determine the base fee and the pricing algorithm used to calculate the adjusted base fee are selected, using the pricing rule engine, based on the geographic region.

2. The computer-implemented system of claim 1, wherein the plurality of configurations comprise a threshold number of deliverers available to fulfill delivery orders and a threshold number of delivery orders that need to be fulfilled.

3. The computer-implemented system of claim 2, wherein adjusting, by the batch system using the pricing algorithm, the base fee for fulfilling the plurality of delivery orders further comprises:
   comparing a current number of deliverers available to fulfill delivery orders to the threshold number of deliverers available to fulfill delivery orders;

comparing a current number of delivery orders that need to be fulfilled to the threshold number of delivery orders that need to be fulfilled; and adjusting the base fee based on the comparison of the number of deliverers available and the comparison of the number of delivery orders that need to be fulfilled.

4. The computer-implemented system of claim 1, wherein the plurality of configurations comprise a number of deliverers in a process of fulfilling delivery orders and a number of additional delivery orders placed.

5. The computer-implemented system of claim 4, wherein adjusting, by the batch system using the pricing algorithm, the base fee for fulfilling the plurality of delivery orders further comprises:

determining a ratio of a current number of deliverers available to fulfill delivery orders and the number of deliverers in the process of fulfilling delivery orders to a current number of delivery orders that need to be fulfilled and the number of additional delivery orders placed; and adjusting the base fee based on the determined ratio.

6. The computer-implemented system of claim 5, wherein the current number of deliverers available to fulfill delivery orders, the number of deliverers in the process of fulfilling delivery orders, the current number of delivery orders that need to be fulfilled, and the number of additional delivery orders placed are weighted.

7. The computer-implemented system of claim 1, wherein the plurality of configurations associated with the geographic region are continuously adjusted based on a number of delivery orders that need to be fulfilled and a number of deliverers available to fulfill delivery orders.

8. The computer-implemented system of claim 1, wherein the at least one processor is further configured to execute the instructions to:

calculate a distance fee based on a total distance between a starting location and a delivery address associated with each of the plurality of delivery orders; and adjust the adjusted base fee based on the distance fee.

9. The computer-implemented system of claim 1, wherein the one or more features further comprise at least one of a decline count associated with each of the plurality of delivery orders or one or more characteristics associated with a delivery route for each of the plurality of delivery orders.

10. The computer-implemented system of claim 1, wherein the at least one processor is further configured to execute the instructions to predict, using a machine learning algorithm, at least one of a number of delivery orders that will need to be fulfilled or a future number of deliverers that will be available to fulfill delivery orders at a particular time.

11. A computer-implemented method for dynamically adjusting payout to deliverers, the method comprising:

receiving a plurality of delivery orders, wherein each of the plurality of delivery orders is associated with a delivery address in a geographic region, and wherein the geographic region is associated with a plurality of configurations;

determining a base fee for fulfilling the plurality of delivery orders in the geographic region based on the plurality of configurations associated with the geographic region;

adjusting, by a batch system using a pricing algorithm, the base fee for fulfilling the plurality of delivery orders based on the plurality of configurations, wherein the batch system is part of one or more offline services of a computing system;

receiving one or more features associated with the plurality of delivery orders, wherein the one or more features comprise at least one of a time of day each delivery order was placed or a geographic region associated with each delivery order; and adjusting the adjusted base fee based on the received one or more features, wherein the plurality of configurations used to determine the base fee and the pricing algorithm used to calculate the adjusted base fee are selected, using a pricing rule engine of the one or more offline services of the computing system, based on the geographic region, wherein the one or more offline services are separate from one or more online services of the computing system.

12. The method of claim 11, wherein the plurality of configurations comprise a threshold number of deliverers available to fulfill delivery orders and a threshold number of delivery orders that need to be fulfilled.

13. The method of claim 12, wherein adjusting, by the batch system using the pricing algorithm, the base fee for fulfilling the plurality of delivery orders further comprises:

comparing a current number of deliverers available to fulfill delivery orders to the threshold number of deliverers available to fulfill delivery orders;

comparing a current number of delivery orders that need to be fulfilled to the threshold number of delivery orders that need to be fulfilled; and adjusting the base fee based on the comparison of the number of deliverers available and the comparison of the number of delivery orders that need to be fulfilled.

14. The method of claim 11, wherein the plurality of configurations comprise a number of deliverers in a process of fulfilling delivery orders and a number of additional delivery orders placed.

15. The method of claim 14, wherein adjusting, by the batch system using the pricing algorithm, the base fee for fulfilling the plurality of delivery orders further comprises:

determining a ratio of a current number of deliverers available to fulfill delivery orders and the number of deliverers in the process of fulfilling delivery orders to a current number of delivery orders that need to be fulfilled and the number of additional delivery orders placed; and adjusting the base fee based on the determined ratio.

16. The method of claim 15, wherein the current number of deliverers available to fulfill delivery orders, the number of deliverers in the process of fulfilling delivery orders, the current number of delivery orders that need to be fulfilled, and the number of additional delivery orders placed are weighted.

17. The method of claim 11, further comprising:

calculating a distance fee based on a total distance between a starting location and a delivery address associated with each of the plurality of delivery orders; and adjusting the adjusted base fee based on the distance fee.

18. The method of claim 11, wherein the one or more features further comprise at least one of a decline count associated with each of the plurality of delivery orders or one or more characteristics associated with a delivery route for each of the plurality of delivery orders.

19. The method of claim 11, further comprising predicting, using a machine learning algorithm, at least one of a number of delivery orders that will need to be fulfilled or a future number of deliverers that will be available to fulfill delivery orders at a particular time.

20. A computer-implemented system for dynamically adjusting payout to deliverers, the computer-implemented system comprising:
- one or more online services;
- one or more offline services separate from the one or more online services, the one or more offline services comprising a batch system and a pricing rule engine;
- a memory storing instructions; and
- at least one processor configured to execute the instructions to:
  - receive a plurality of delivery orders, wherein each of the plurality of delivery orders is associated with a delivery address in a geographic region, wherein the geographic region is associated with a plurality of configurations, and wherein the plurality of configurations are continuously adjusted based on a number of delivery orders that need to be fulfilled and a number of deliverers available to fulfill delivery orders;
  - determine a base fee for fulfilling the plurality of delivery orders in the geographic region based on the plurality of configurations associated with the geographic region;
  - adjust, by the batch system using a pricing algorithm, the base fee for fulfilling the plurality of delivery orders based on the plurality of configurations;
  - receive features associated with the plurality of delivery orders, wherein the features comprise a time of day each delivery order was placed and a geographic region associated with each delivery order; and
  - adjust the adjusted base fee based on the received features,
  - wherein the plurality of configurations used to determine the base fee and the pricing algorithm used to calculate the adjusted base fee are selected, using the pricing rule engine, based on the geographic region.

* * * * *